No. 766,382. PATENTED AUG. 2, 1904.
W. B. POTTER.
LUBRICATING DEVICE.
APPLICATION FILED FEB. 14, 1901.
NO MODEL.
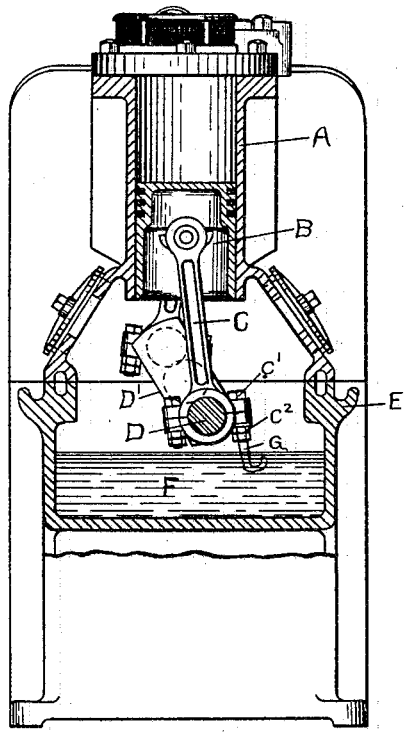
Fig. 1
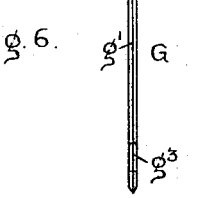
Fig. 5. Fig. 6.
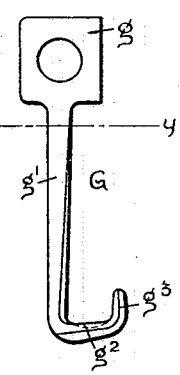
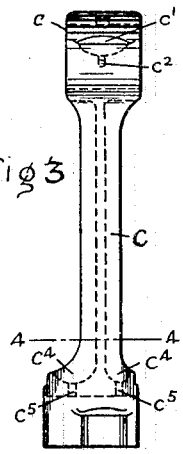
Fig. 3. Fig. 4.
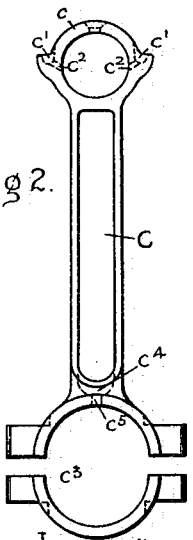
Fig. 2.
Witnesses:
Rob't C. Chipman
Benjamin B. Hull
Inventor
William B. Potter
by Albert G. Davis
Atty No. 766,382. Patented August 2, 1904.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

LUBRICATING DEVICE.

SPECIFICATION forming part of Letters Patent No. 766,382, dated August 2, 1904.

Application filed February 14, 1901. Serial No. 47,228. (No model.)

*To all whom it may concern:*

Be it known that I, WILLIAM B. POTTER, a citizen of the United States, residing at Schenectady, county of Schenectady, State of New York, have invented certain new and useful Improvements in Lubricating Devices, of which the following is a specification.

This invention relates to lubricating devices; and its object is to supply a regular but diminutive quantity of oil to the bearings of a connecting-rod in pumps, engines, or other machinery.

In a pump or engine intended to be driven at very high speeds it is necessary to insure the constant and complete lubrication of the bearings of all moving parts. Where the machine is an upright one with the cylinder or cylinders at the top and the crank-shaft below, it is customary to provide an oil-well into which the crank dips at each revolution, so that it may not only keep itself well lubricated, but may splash the oil up over the cross-head or other bearings, the frame of the machine forming a closed casing to confine the flying oil. In the case of very fast running machines this mode of oiling is not wholly satisfactory owing to the excessive churning of the oil and other undesirable results. To avoid the objections found in practice, I have invented the device which forms the subject-matter of this application.

It consists in a small hook, of sheet metal, attached to the crank end of the connecting-rod and so shaped as to pick up a drop or two of oil at each revolution and fling it to the upper part of the inclosing frame, where it can lubricate the piston or the upper bearing of the connecting-rod or trickle down the rod to the crank-bearing. The hook projects below the crank, so that the level of the oil need not be so high as to immerse the crank, but only to permit the hook to dip below it. This avoids all splashing and yet insures a constant and regular supply of oil for the bearings. In combination with the hook I use a connecting-rod having pockets to catch the oil and convey it to the bearings.

I have shown the invention applied to a small double-cylinder air-pump, though it is equally well applicable to similar machines for other purposes.

In the accompanying drawings, Figure 1 is a vertical section of the pump through one of the cylinders. Fig. 2 is a side elevation of the two parts of the connecting-rod. Fig. 3 is an edge elevation of the rod. Fig. 4 is a cross-sectional plan view on the line 4 4, Fig. 3. Fig. 5 is a full-sized elevation of the hook. Fig. 6 is an edge view showing the upper part of the hook bent over at right angles.

Let A represent the cylinder of a pump, engine, or the like in which reciprocates the piston B, which may be of the trunk type, the cylinder having an open lower end to permit the connecting-rod C to be pivoted directly to the piston. On each side or edge of the rod adjacent to the solid bearing $c$ is a pocket $c'$, having an open upper end and connected by a port $c^2$ with the wearing-surface of the bearing. The lower end of the rod has a divided crank-bearing $c^3$ to receive the crank-pin D on the crank D'. In each side of the rod just above the bearing $c^3$ is an open pocket $c^4$, connecting with the bearing by a port $c^5$.

The frame E of the machine forms a casing inclosing the rod and crank, and its lower part constitutes a well for oil F, the level of which stands just below the crank in its lowest position. Attached to the lower or crank end of the connecting-rod is a hook G, made of sheet-steel or the like and having at its upper end a broad head $g$, provided with a hole for a fastening-screw. The hook can be conveniently attached to the rod by bending the head $g$ at right angles to the shank $g'$—say on the line $x$ $y$, Fig. 5—and slipping it over one of the clamping-bolts C' before the nuts C² are put on. The shank $g'$ is dressed off to a thin edge in front in order to pass through the oil with as little disturbance as possible. For the same reason the bottom of the lateral arm $g^2$ and the front edge of the tip $g^3$ are similarly chamfered to an edge. The top of the arm $g^2$ is left flat, or it may be slightly cupped, if desired, to pick up a minute quantity of oil. The end of the tip $g^3$ is rounded and smooth and is bent upwardly, as shown.

The hook extends below the end of the connecting-rod, so as to dip into the oil at every revolution and carry up a little oil on the arm $g^2$. As the piston nears the upper end of its stroke the checking of the motion of the hook flings the drop or two of oil off the smooth tip, the oil striking on the inside of the cylinder or the piston or on the connecting-rod. In the former case it lubricates the cylinder and piston. In the latter case it runs into one of the pockets $c$ and thence through the port $c^2$ to the upper bearing, or it trickles down the rod into one of the pockets $c^4$ and thence through the port $c^5$ to the crank-pin. The hook thus forms a most efficient oiling device and obviates all churning and undue splashing of the oil.

What I claim as new, and desire to secure by Letters Patent of the United States, is—

1. A lubricating device for an inclosed crank and connecting-rod, operating above an oil-well, consisting of a hook having a downwardly-extending shank, a lateral arm, and an upwardly-bent tip.

2. As a lubricating device for pumps and the like, a hook having a shank adapted to be connected to a moving part, a lateral arm and an upwardly-bent tip, said shank and tip being chamfered on their front edges.

3. As a lubricating device, a hook adapted to be connected to a connecting-rod and having chamfered front and bottom edges, and a flat top.

4. As a lubricating device, a hook adapted to be connected to a connecting-rod and having chamfered front and bottom edges, a flat top, and a rounded tip.

5. The combination with a connecting-rod, of a slender part extending therefrom adapted to dip into an oil-well below the crank end of said rod.

6. The combination with a crank and a connecting-rod, of a slender hooked part extending from said rod adapted to dip into an oil-well below said crank.

In witness whereof I have hereunto set my hand this 12th day of February, 1901.

WILLIAM B. POTTER.

Witnesses:
BENJAMIN B. HULL,
MARGARET E. WOOLLEY.